May 5, 1959  J. BÖRRESEN ET AL  2,885,460
FLEXIBLE COMBINED CONDUIT AND CABLE ASSEMBLY
Filed Jan. 19, 1955

INVENTORS
JAC. BÖRRESEN
GUNNAR N. PETTERSEN
BY
ATTORNEYS

United States Patent Office 2,885,460
Patented May 5, 1959

2,885,460

FLEXIBLE COMBINED CONDUIT AND CABLE ASSEMBLY

Jac Börresen and Gunnar Nimrod Pettersen, Askim, Norway

Application January 19, 1955, Serial No. 482,826

Claims priority, application Norway January 26, 1954

4 Claims. (Cl. 174—70)

For the fixed mounting of electric installation cables, especially indoors, the cables are in general fastened with clamps which are placed with relatively short spacing and fixed to the wall or other supporting surface with two screws each. This manner of attachment is very time-wasting, especially when the support consists of concrete or brick-work, since mostly about 8 to 10 screws are employed for each meter of cable length, and for these plug holes must be bored in the support. In addition comes, that the clamps afford an unsightly appearance.

For movable cables such as equiment conductors from plug boxes, clamps, clevises or the like have likewise been used for holding the cable in cases in which the apparatus concerned is to have a fixed place, as for example often is the case with bracket lamps. This is unsatisfactory in several respects, because apart from being unsightly these clamps etc. easily entail damage on the insulation of the cable by pull in the cable if the apparatus is moved, or for example if children inadvertently should grip the cable and tension it. For this reason such attachment members have to a great extent not at all been allowed to be used for conductors from plug boxes.

The present invention relates to a method for detachable mounting of flexible electric cables by which the drawbacks referred to above are avoided. This is primarily achieved by using a ledge of elastic material and having an open, largely U-formed cross-sectional shape with inwardly projecting edge flanges and having an internal profile corresponding to the exterior profile of the cable, which ledge is attached in its bottom portion to the supporting surface, whereafter the cable is placed in the ledge progressively from one end thereof by being pressed into the ledge from the front while overcoming resiliency in the ledge.

When made of a suitable material the mounting strip used according to the invention may have sufficient resiliency for providing a satisfactory attachment with a considerably greater spacing of fastening screws, brads or the like than what is employed at present for the usual clamps, apart from the fact that only one screw or the like is required for each fastening point, and in addition comes that after mounting the strip forms a certain mechanical protection for the cable. Since the fastening screws or the like extend through the bottom portion of the strip, they are entirely concealed after the cable has been laid in, and it is not possible for children to grip around the cable, nor around the ledge if the latter fits the support, for example a wall surface, tightly with its bottom portion. On the other hand a pull in the cable, for example when moving a connected apparatus, will not cause excessive strain or damage on the insulation, since the only thing that can happen is that the cable is pulled out of the ledge on a shorter or longer distance.

The ledge may be made of metal or other relatively rigid material having a sufficient resilient flexibility of the side portions and having a channel-shaped cross-section produced by rolling, drawing, pressing, bending or otherwise, and, if desired, provided with a protective coating, for example of a suitable lacquer, and supplied in suitable lengths.

For most uses, however, and especially for conductors from plug boxes it is preferable according to the invention to use a ledge of a pliable, elastic, insulating material, for example a thermoplastic artificial resin, and made with the desired cross-sectional profile, for example by extrusion or pressing. Hereby the touch danger in the case of a damage on the cable is reduced and hence it becomes warrantable to use the ledge in cases where the possibility of damage is particularly great and therefore the rules are particularly severe. Further, a ledge of this kind has the great advantage that it is capable of being entirely coiled up and can be pinned or nailed to any desired support, including also for example wood panel, wallboard, etc., with any desired spacing subject to individual requirements and without the necessity of providing the ledge with screw-holes beforehand. With a view to this ledge may be shaped with a longitudinal groove in its bottom for receiving the heads of brads, nails or the like. If it is desired or prescribed that the cable shall not at all be in contact with metal, the brads may have heads with an insulating coating, for example a lacquer applied by dipping. Another alternative may consist in providing the ledge on its rear side with a T-shaped longitudinal groove with which it may be fitted onto the brad heads before the brads are hammered home completely.

Apart from the method specified the scope of the invention also includes the ledge-formed attachment member used.

The invention is illustrated in the accompanying drawings, which show convenient embodiments.

Figure 1:
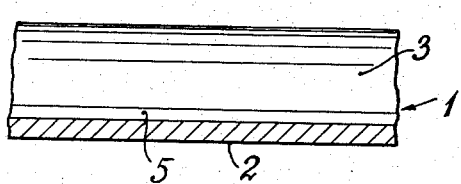
Figs. 1 and 2 are longitudinal and transverse sectional views respectively of an attachment ledge used in an embodiment of the invention.
Figure 2:
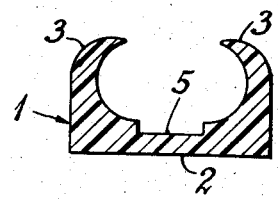
Figure 3:
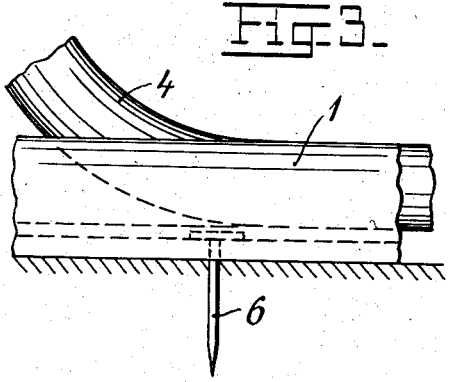
Fig. 3 is a side view of the ledge attached to a supporting surface, and the cable during the mounting therein.
Figure 4:
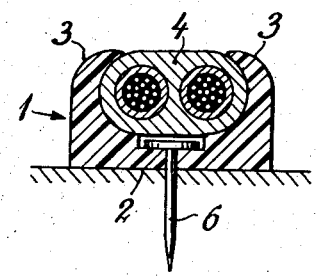
Fig. 4 is a cross-sectional view of the ledge with the cable mounted.

In Figs. 1 to 4, 1 designates an attachment ledge which may be produced wtih the desired cross-sectional shape by extrusion or pressing of a thermoplastic artificial resin or other suitable moldable material, for example of the same kind as that used as insulation in permanently mounted or movable cables, and with suitable resiliency and pliability. The ledge is largely of U-shaped cross-section with a flat bottom portion 2 and side flanges 3, 3, which at the top are curved inwards so as to engage the top of the cable 4. In the case illustrated the latter is assumed to be a flat cable as shown in Fig. 4, and the ledge 1 has a corresponding internal profile, but the attachment ledge may, of course, also receive a shape suitable for the insertion of a cable having a different shape, for example round. In the bottom the ledge 1 has a longitudinal groove 5, which receives the heads of brads 6, with which the ledge 1 is fixed to the wall before the cable 4 is laid in. The insertion may take place merely by pressing the cable into the ledge at one end of the latter and then passing the finger along the cable with a certain pressure, whereby it will successively adopt the desired position. Correspondingly, if the cable is to be taken out occasionally, it is most convenient to start at one end and pull the cable free. If the cable extends over a certain free distance from the ledge to a standard lamp or other movable apparatus, there will be no danger that the fastening clamps on the lamp or on the apparatus are subjected to excessive stress by tension in the cable when the lamp or the apparatus is moved, since the cable will be pulled out of the ledge over a corresponding length.

It will be understood that a ledge of the design described is easily capable of being coiled up and also of being mounted with a certain slack lateral curvature in places where the conditions might make this desirable.

Figure 5:
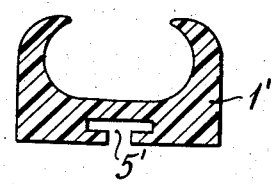
Fig. 5 is a sectional view corresponding to Fig. 2 of a modified embodiment of the attachment ledge.

Fig. 5 illustrates a cross-sectional shape which protects the cable against contact with the heads of fastening brads or nails. In this embodiment the latter will at first be hammered into the support concerned, whereafter the ledge 1' with a T-shaped groove 5' in the bottom is threaded lengthwise onto the heads of the brads or sprung onto them laterally, whereupon the brads are hammered home, conveniently with the use of a drift placed against the bottom inside the ledge.

Figure 6:
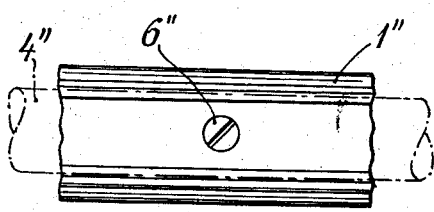
Figs. 6 and 7 are front and cross-sectional views respectively of a further embodiment of the attachment ledge in mounted condition.
Figure 7:
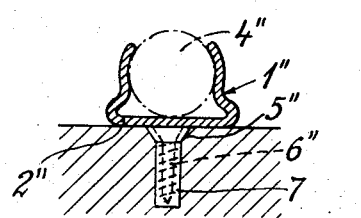

Unlike the embodiments according to Figs. 1 to 5, the Figs. 6 and 7 show an attachment ledge 1" of a more rigid material, for example metal, if desired with a protecting lacquer, or a relatively rigid plastic or the like, and made with so small wall thickness that it is capable of yielding resiliently to an extent sufficient for permitting insertion and removal of the cable (indicated as a round cable by dash and dot lines at 4") from and towards the front respectively in the same way as in the preceding embodiments. The ledge 1" may be produced by drawing, rolling, pressing or the like and is bulged outwards in cross-section at both edges of the bottom portion 2" in order to afford a stable bearing surface against the support. Suitably spaced along the center of the bottom portion 2" screw-holes 5" for counter-sunk screws 6" (or suitable brads or the like) are provided in the ledge, by which screws the ledge is fixed with its bottom portion 2" bearing tightly against the support, if necessary after the insertion of dowels 7.

Although an attachment ledge according to the invention is intended to extend continuously over the length of the cable in straight stretches, the use of the invention will as a rule involve a saving, in the first place because of the more rapid mounting, but also because there will often be obtained a reduction in purchase costs due to savings in the number of screws, dowels, brads etc.

When passing from one stretch to another the cable will as a rule not require any separate attachment in the bend, but, of course, it is also possible to use separate point attachments with clamps etc., or to use suitable curved channel pieces in the transfer areas.

We claim:
1. An electric wiring system for mounting on a wall surface comprising, in combination; a flexible conduit for an electric cable, said conduit being of an electrically insulating material, and comprising an elongated coilable base member being capable of bending transversely to the direction in which the same extends and in the plane of said wall surface, said base member being of substantially U-shaped cross-section and having a single longitudinally extending permanently uncovered groove, said base member further having inwardly projecting, longitudinal elastic edge flanges, on both sides of said groove and a flexible cable inserted in said groove, the internal profile of said groove corresponding to the exterior profile of said cable and the exterior profile of said conduit being such that when said cable is inserted in said groove, so much of the surface portion of said cable which is out of contact with the inner surface of said groove, is substantially flush with the outer surface of said conduit, said edge flanges being adapted to yield resiliently to an extent sufficient to permit an easy insertion of the cable into said groove from the open top side of the latter, and to grip the inserted cable tightly, while said edge flanges resist being bent asunder by hand and thus prevent removal of said cable via the open side of said groove, said base member extending substantially over the entire length of said cable in said conduit along said wall surface, said base member and said cable inserted therein being, due to the cross-sectional configuration of said base member, jointly adapted to be given a lateral curvature.

2. An electric wiring system as described in claim 1 wherein said flexible conduit consists of an electrically insulating thermoplastic material.

3. A wiring system according to claim 1, wherein said conduit has in its bottom portion an internal longitudinal groove for receiving the heads of fastening screws or the like.

4. A wiring system according to claim 1, wherein said conduit has on its rear side a T-shaped longitudinal groove suitable for permitting it to be mounted on brads which have been fixed to the support beforehand, and are hammered home after the mounting of the conduit.

References Cited in the file of this patent

UNITED STATES PATENTS

| | | |
|---|---|---|
| 1,984,356 | Abbott | Dec. 18, 1934 |
| 2,079,274 | Baker | May 4, 1937 |
| 2,704,302 | Budd | Mar. 15, 1955 |

FOREIGN PATENTS

| | | |
|---|---|---|
| 298,884 | Great Britain | Oct. 18, 1928 |
| 277,805 | Switzerland | Dec. 1, 1951 |
| 1,033,825 | France | July 16, 1953 |